(12) United States Patent
Barone et al.

(10) Patent No.: US 10,046,769 B2
(45) Date of Patent: Aug. 14, 2018

(54) CONTROL METHOD FOR CARRYING OUT A GEAR SHIFT IN A TRANSMISSION PROVIDED WITH A DUAL-CLUTCH GEARBOX

(71) Applicant: Ferrari S.p.A., Modena (IT)

(72) Inventors: Alessandro Barone, Bologna (IT); Barbara Prina, Colonno (IT); Francesco Marcigliano, Maranello (IT)

(73) Assignee: Ferrari S.p.A., Modena (IT)

( * ) Notice: Subject to any disclaimer, the term of this patent is extended or adjusted under 35 U.S.C. 154(b) by 166 days.

(21) Appl. No.: 15/254,947

(22) Filed: Sep. 1, 2016

(65) Prior Publication Data

US 2017/0088140 A1 Mar. 30, 2017

(30) Foreign Application Priority Data

Sep. 3, 2015 (IT) .......................... 102015000048411

(51) Int. Cl.
*B60W 30/19* (2012.01)
*F16H 61/688* (2006.01)
(Continued)

(52) U.S. Cl.
CPC ............ *B60W 30/19* (2013.01); *B60W 10/06* (2013.01); *B60W 10/113* (2013.01); *F16H 61/0204* (2013.01); *F16H 61/688* (2013.01); *B60W 2510/0208* (2013.01); *B60W 2510/0638* (2013.01); *B60W 2510/1015* (2013.01); *B60W 2710/021* (2013.01); *B60W 2710/0666* (2013.01); *F16H 3/006* (2013.01); *F16H 57/0457* (2013.01); *F16H 57/0494* (2013.01)

(58) Field of Classification Search
CPC .... B60W 30/182; B60W 30/19; B60W 10/06; B60W 10/113; B60W 2510/0208; B60W 2510/0638; B60W 2710/021; B60W 2710/0666; F16H 61/0204; F16H 61/688; F16H 2061/062
See application file for complete search history.

(56) References Cited

U.S. PATENT DOCUMENTS

2004/0166990 A1* 8/2004 Buchanan et al. ...... B60K 41/02
                                                                477/174
2004/0198552 A1* 10/2004 Bothe et al. ............ F16H 61/26
                                                                477/124

(Continued)

FOREIGN PATENT DOCUMENTS

DE   10 2009 020 651 A1   11/2010
EP            2 230 144 A1    9/2010
EP            2 239 484 A1   10/2010

*Primary Examiner* — Huan Le
(74) *Attorney, Agent, or Firm* — Blank Rome LLP

(57) ABSTRACT

A control method for carrying out a gear shift in a transmission provided with a dual-clutch gearbox, so as to shift from a current gear to a following gear. The control method comprises the steps of; receiving a gear-shift command; filling with oil, always supplying the maximum possible oil flow rate, a second clutch associated with the following gear after receiving the gear-shift command; completely closing the second clutch at the maximum possible speed as soon as the oil filling ends; and completely opening a first clutch associated with the current gear A at the maximum possible speed as soon as the oil filling in the second clutch ends.

15 Claims, 9 Drawing Sheets

(51) Int. Cl.
*F16H 61/02* (2006.01)
*B60W 10/06* (2006.01)
*B60W 10/113* (2012.01)
F16H 57/04 (2010.01)
F16H 3/00 (2006.01)

(56) References Cited

U.S. PATENT DOCUMENTS

2010/0261577 A1 10/2010 MacFarlane et al.
2011/0015035 A1* 1/2011 Marcigliano et al. B60W 10/02
477/77
2012/0216640 A1 8/2012 Hoffmeister et al.

* cited by examiner

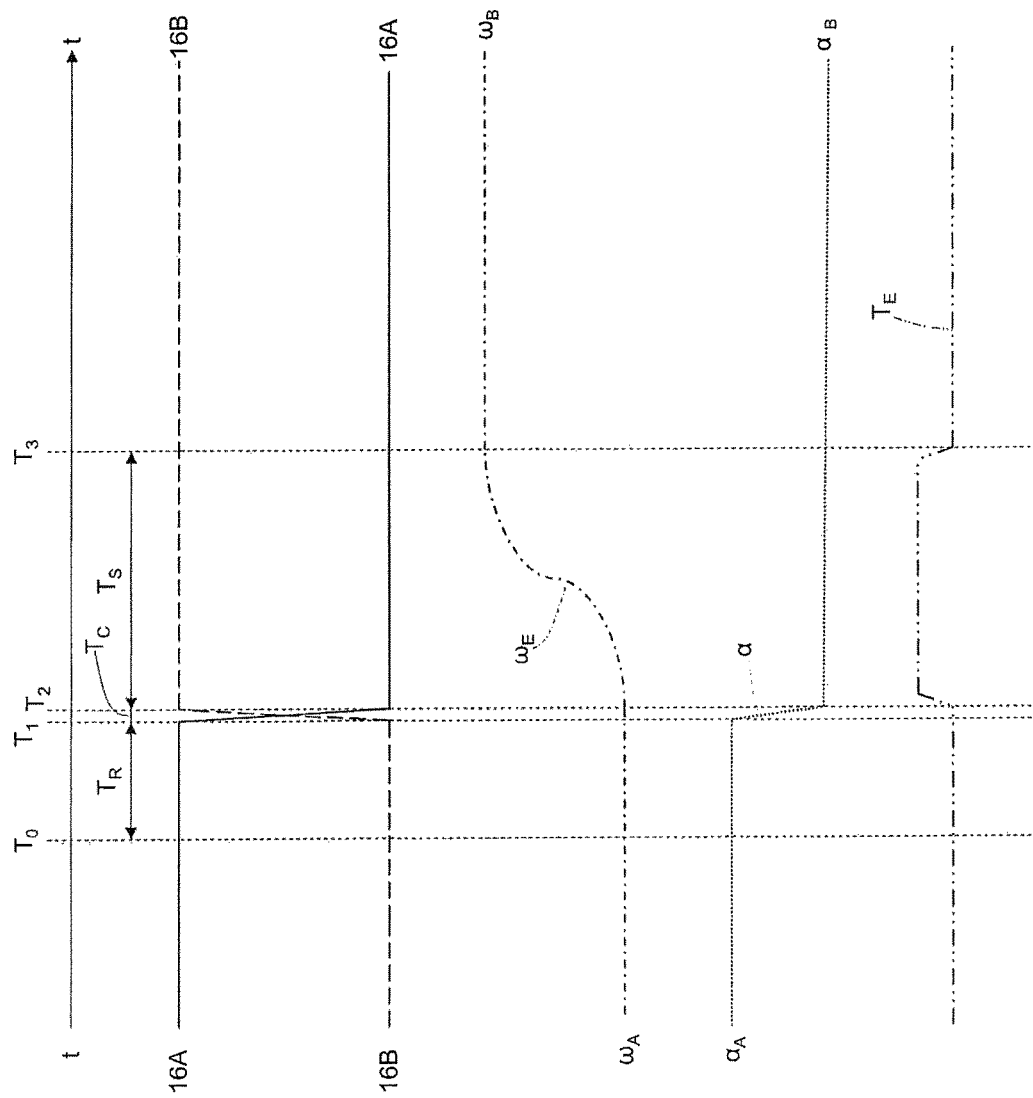

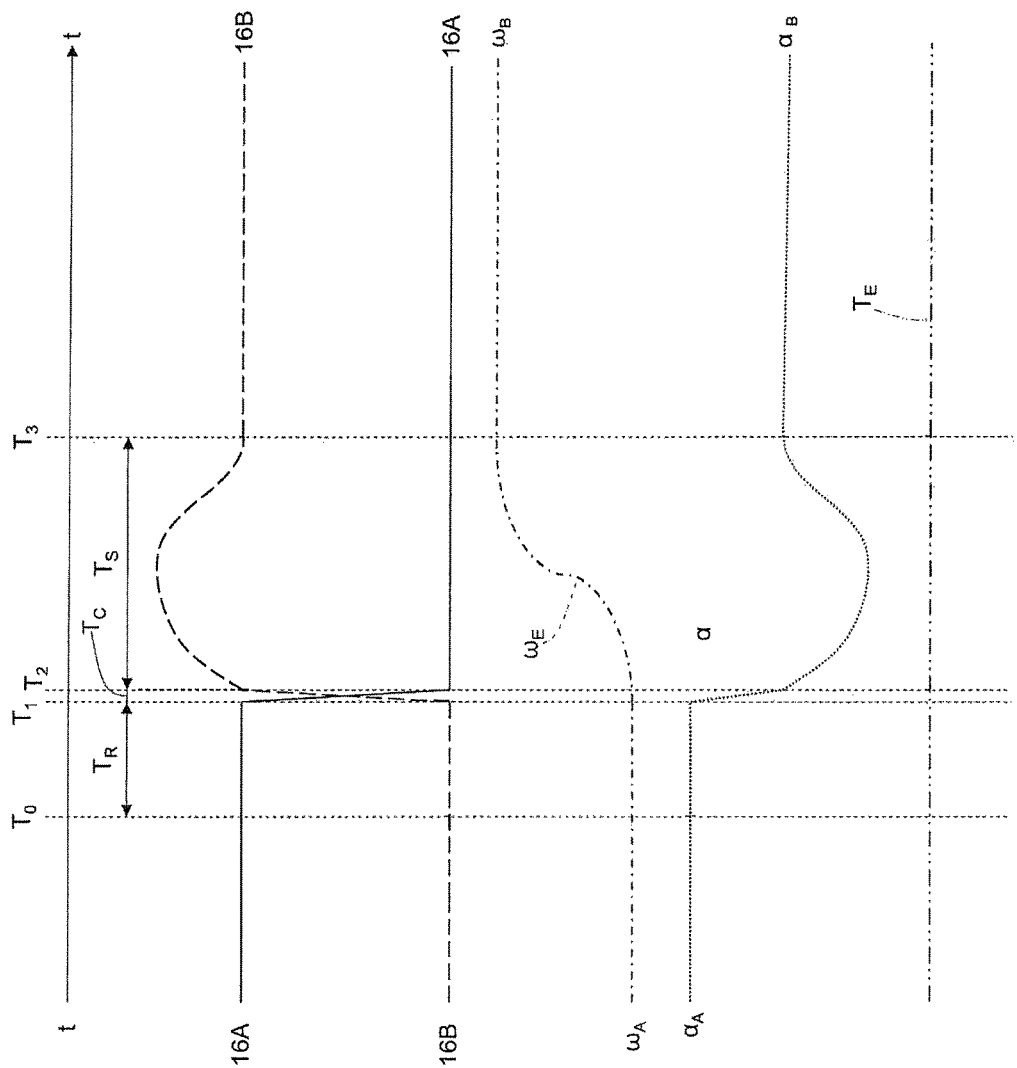

CONTROL METHOD FOR CARRYING OUT A GEAR SHIFT IN A TRANSMISSION PROVIDED WITH A DUAL-CLUTCH GEARBOX

FIELD OF THE INVENTION

The present invention relates to a control method for carrying out a gear shift in a transmission provided with a dual-clutch gearbox, in which the clutches are in an oil bath.

PRIOR ART

A transmission provided with a dual-clutch gearbox comprises a pair of primary shafts coaxial with and independent of one another and fitted one inside the other; two coaxial clutches, each of which is suitable to connect a corresponding primary shaft to a drive shaft of an internal combustion engine; and at least one secondary shaft that transmits the motion to the drive wheels and may be coupled to the primary shafts by means of corresponding gear pairs, each of which defines a gear.

During a gear shift, the current gear couples the secondary shaft to a primary shaft while the following gear couples the secondary shaft to the other primary shaft; as a consequence, the gear shift takes place by crossing the two clutches, i.e. by opening the clutch associated with the current gear and simultaneously closing the clutch associated with the following gear.

The clutches used in a dual-clutch gearbox are usually in an oil bath and are therefore pressure-controlled (i.e., the degree of opening/closing of the clutch is determined by the pressure of the oil within said clutch). When a transmission control unit receives the gear shift command from the driver (the driver usually operates a lever or a button arranged on or in proximity of the steering wheel), the transmission control unit immediately starts to close the clutch associated with the following gear; however, before the clutch associated with the following gear can start transmitting torque to the drive wheels, a certain delay time (usually between 80 and 220 milliseconds) has to elapse during which the filling of oil in the clutch is completed.

When the clutch associated with the following gear starts transmitting torque to the drive wheels (thus at the end of the delay time) the clutch associated with the current gear is gradually opened to determine a crossing of the two clutches; it is worth noting that the opening of the clutch associated with the current gear occurs with no delay, as the clutch is already filled with oil under pressure and must be emptied of the existing oil. As the clutch associated with the following gear increases the torque transmitted to the drive wheels, the clutch associated with the current gear decreases the torque transmitted to the drive wheels in a complementary manner so as to always keep both the torque generated by the combustion engine and the torque transmitted to the drive wheels constant.

It has been noted that the driver is aware of the delay (equal to the delay time) between the moment in which he/she sends the gear shift command and the moment the gear shift actually starts (i.e., the moment in which the clutch associated with the following gear starts transmitting torque to the drive wheels). This delay, although extremely short and in any case not affecting performance as the transmission of the torque to the drive wheels is never interrupted or decreased, is considered to be annoying and detrimental by a substantial percentage of drivers who wrongly believe that the traditional automatic manual transmission with a single-clutch gearbox is more responsive and therefore achieves higher performance.

Furthermore, the average driver is used to the sensations transmitted by traditional single-clutch gearboxes and so expects to feel a "torque hole" (i.e., a "an acceleration gap") during an upward gear shift followed by an increase in the engine torque (i.e., in acceleration) at the end of the upward gear shift. On the contrary, in a standard gear shift of a dual-clutch gearbox, during an upward gear shift the driver only notices a gradual reduction in the longitudinal acceleration of the vehicle owing to the gradual lengthening of the gear ratio of the torque generated by the engine; said method of gear shifting is very positive in terms of performance, but the majority of drivers experience exactly the opposite, and consider it detrimental to performance.

It is worth noting that drivers' opinions must be held in high regard, even when technically wrong, since the vast majority of drivers judge a car's performance on the basis of their own perceptions and beliefs, rather than objective criteria. In other words, what matters most is that drivers must feel the vehicle to be satisfactory (even if there is a slight reduction in performance).

Patent application EP2239484A1 and patent application EP2230144A1 describe a control method of shifting gear in a transmission with a twin-clutch gearbox that improves the driver's perception of gear shifting (namely by allowing the driver to find gear shifting a pleasant experience) without undermining performance.

SUMMARY OF THE INVENTION

The object of the present invention is to provide a control method for carrying out a gear shift in a transmission provided with a dual-clutch gearbox, said control method making it possible to further improve the driver's perception of gear shifting, while at the same time without significantly undermining performance.

According to the present invention there is provided a control method for carrying out a gear shift in a transmission provided with a dual-clutch gearbox, as claimed in the appended claims.

BRIEF DESCRIPTION OF DRAWINGS

The present invention will now be described with reference to the accompanying drawings, which illustrate a non-limiting embodiment thereof, in which:

FIGS. 4-9 illustrate the evolution in time of the torques transmitted by the two clutches of the dual-clutch gearbox, the speed of rotation of a drive shaft of the engine, the longitudinal acceleration of the vehicle and the torque generated by the engine during different gear shifts performed according to the control method of the present invention.

PREFERRED EMBODIMENTS OF THE INVENTION

Figure 1:
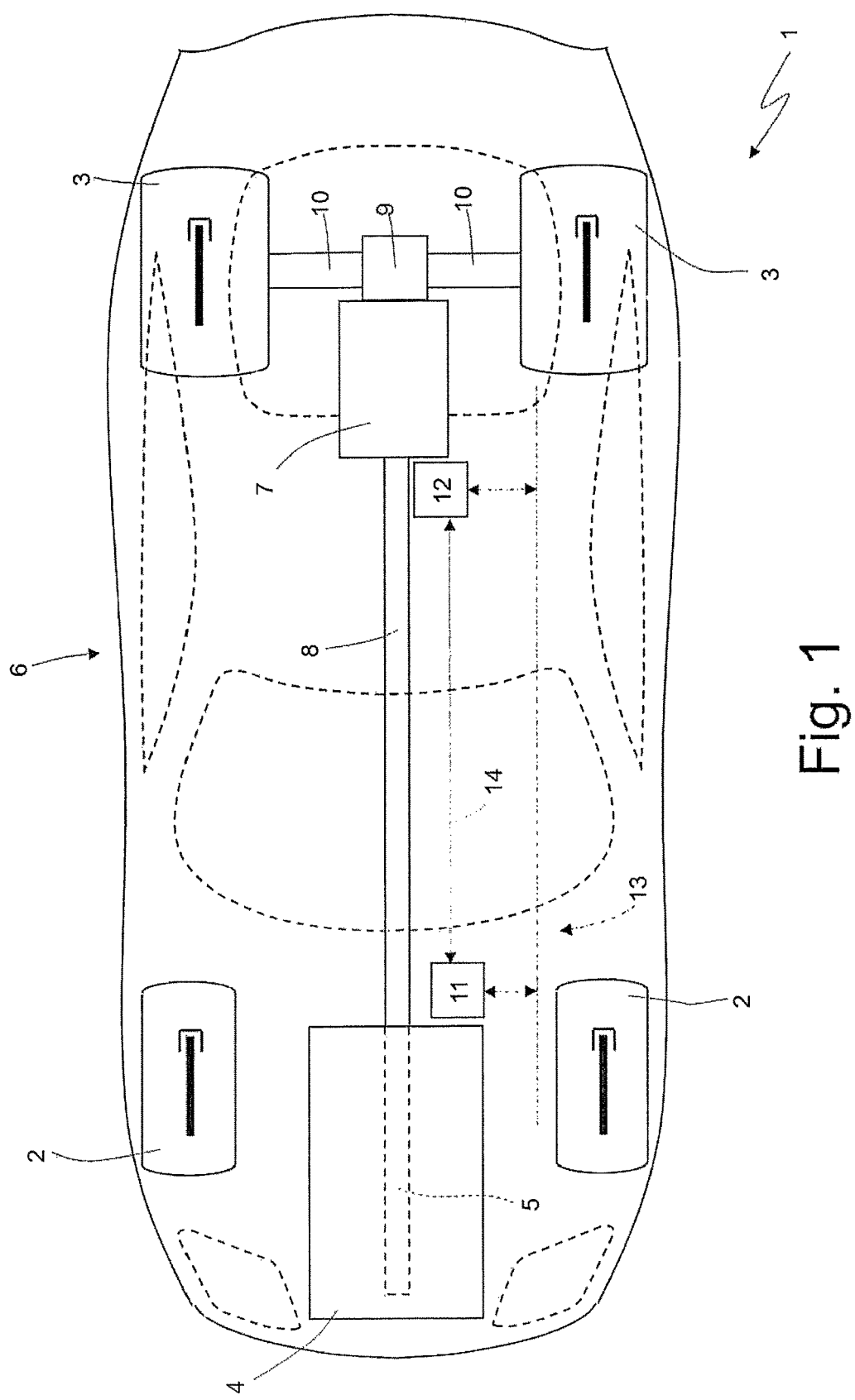
FIG. 1 is a schematic and plan view of a rear wheel drive vehicle provided with a transmission provided with a dual-clutch gearbox that is controlled according to the control method of the present invention.

In FIG. 1, number 1 indicates as a whole a vehicle (specifically, a car) provided with two front wheels 2 and two rear driving wheels 3; an internal combustion engine 4 is arranged in a front position and is provided with a drive shaft 5 and generates a torque which is transmitted to the rear driving wheels 3 through an automatic manual transmission 6. The transmission 6 comprises a dual-clutch gearbox 7 arranged in a rear position and a drive shaft 8 which connects the drive shaft 5 to an input of the gearbox 7. A self-locking differential 9, from which a pair of axle shafts 10 originate, each of which is connected to a rear driving wheel 3, is connected in cascade to the gearbox 7.

The vehicle 1 comprises a control unit 11 of the engine 4, which ensures control of the engine 4, a control unit 12 of the transmission 6, which ensures control of the transmission 6, and a BUS line 13, which is made according to the CAN (Car Area Network) protocol, extends throughout the vehicle 1 and allows the control units 11 and 12 to communicate with one another. In other words, the control unit 11 of the engine 4 and the control unit 12 of the transmission 6 are connected to the BUS line 13 and may therefore communicate with one other by means of messages sent over said BUS line 13. Moreover, the control unit 11 of the engine 4 and the control unit 12 of the transmission 6 may be directly connected to one another by means of a dedicated synchronization cable 14, which is able to directly transmit a signal from the control unit 12 of the transmission 6 to the control unit 11 of the engine 4 without the delays introduced by the BUS line 13. Alternatively, there may be no synchronization cable 14 and all communications between the two control units 11 and 12 may be performed over the BUS line 13.

Figure 2:
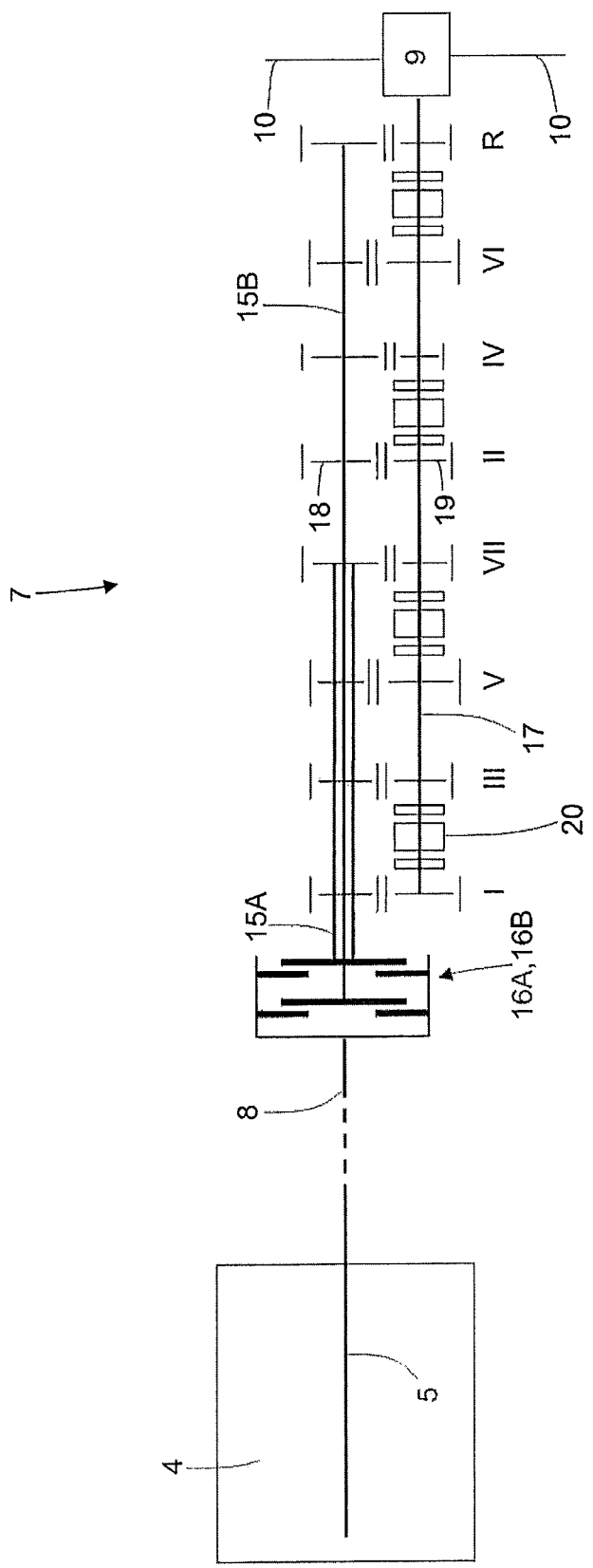
FIG. 2 is a schematic view of the transmission in FIG. 1 provided with a dual-clutch gearbox.

According to that illustrated in FIG. 2, the dual-clutch gearbox 7 comprises a pair of primary shafts 15 coaxial with and independent of one another and fitted one inside the other. Moreover, the dual-clutch gearbox 7 comprises two coaxial clutches 16, each of which is suitable to connect a corresponding primary shaft 15 to the drive shaft 5 of the internal combustion engine 4 by means of interposition of the drive shaft 8. Each clutch 16 is in an oil bath and is therefore pressure-controlled (i.e., the degree of opening/closing of the clutch 16 is determined by the oil pressure within said clutch 16); according to an alternative embodiment, each clutch 16 is dry and is therefore position-controlled (i.e., the degree of opening/closing of the clutch 16 is determined by the position of a mobile member of said clutch 16); thus, each clutch 16 comprises at least one solenoid valve that controls the oil entering the clutch 16 and controls the oil leaving the clutch 16. The dual-clutch gearbox 7 comprises a single secondary shaft 17 connected to the differential 9 which transmits the motion to the rear driving wheels 3; according to an alternative and equivalent embodiment, the dual-clutch gearbox 7 comprises two secondary shafts 17 both connected to the differential 9.

The dual-clutch gearbox 7 has seven forward gears indicated by Roman numerals (first gear I, second gear II, third gear III, fourth gear IV, fifth gear V, sixth gear VI and seventh gear VII) and one reverse gear (indicated by the letter R). The primary shaft 15 and the secondary shaft 17 are mechanically coupled to one another by means of a plurality of gear pairs, each of which defining a corresponding gear and comprising a primary gear 18 fitted on the primary shaft 15 and a secondary gear 19 fitted on the secondary shaft 17. In order to enable the proper operation of the dual-clutch gearbox 7, all odd gears (first gear I, third gear III, fifth gear V, seventh gear VII) are coupled to the same primary shaft 15, while all even gears (second gear II, fourth gear IV and sixth gear VI) are coupled to the other primary shaft 15.

Each primary gear 18 is keyed to a corresponding primary shaft 15 so as to always rotate integrally with said primary shaft 15 and permanently meshes with the corresponding secondary gear 19; on the contrary, each secondary gear 19 is idly mounted on the secondary shaft 17. Moreover, the dual-clutch gearbox 7 comprises four double synchronizers 20, each of which is fitted coaxially with respect to the secondary shaft 17, is arranged between two secondary gears 19, and is suitable to be operated to alternatively engage the two corresponding secondary gears 19 with the secondary shaft 17 (i.e., to alternatively make the two corresponding secondary gears 19 angularly integral with the secondary shaft 17). In other words, each synchronizer 20 may be moved in one direction to engage a secondary gear 19 with the secondary shaft 17, or it may be moved in the other direction to engage the other secondary gear 19 with the secondary shaft 17.

The dual-clutch gearbox 7 comprises a single secondary shaft 17 connected to the differential 9 which transmits the motion to the rear driving wheels 3; according to an alternative and equivalent embodiment, the dual-clutch gearbox 7 comprises two secondary shafts 17 both connected to the differential 9.

The methods for performing a gear shift from a current gear A to a following gear B will now be described. For the sake of simplicity, an upward gear shift during the gear progression will be described, so that the current gear A has a higher gear ratio than the following gear B.

In an initial situation (i.e., before the gear shift), one clutch 16A is closed to transmit the motion to a primary shaft 15A which in turn transmits the motion to the secondary shaft 17 by means of the current gear A which is engaged; on the contrary, one clutch 16B is open and therefore isolates a primary shaft 15B from the drive shaft 8. Before starting the upward gear shift, the following gear B is engaged to connect the primary shaft 15B to the secondary shaft 17 by means of said gear B; such operation is performed automatically irrespective of the driver's wishes as soon as the clutch 16B is opened at the end of the previous gear shift. When the driver sends the gear shift command, the gear shift is performed by opening the clutch 16A to disconnect the primary shaft 15A (thus the gear A) from the drive shaft 8 (i.e., from the drive shaft 5 of the engine 4) and simultaneously closing the clutch 16B to connect the primary shaft 15B (thus the gear B) to the drive shaft 8 (i.e., to the drive shaft 5 of the engine 4).

Figure 3:
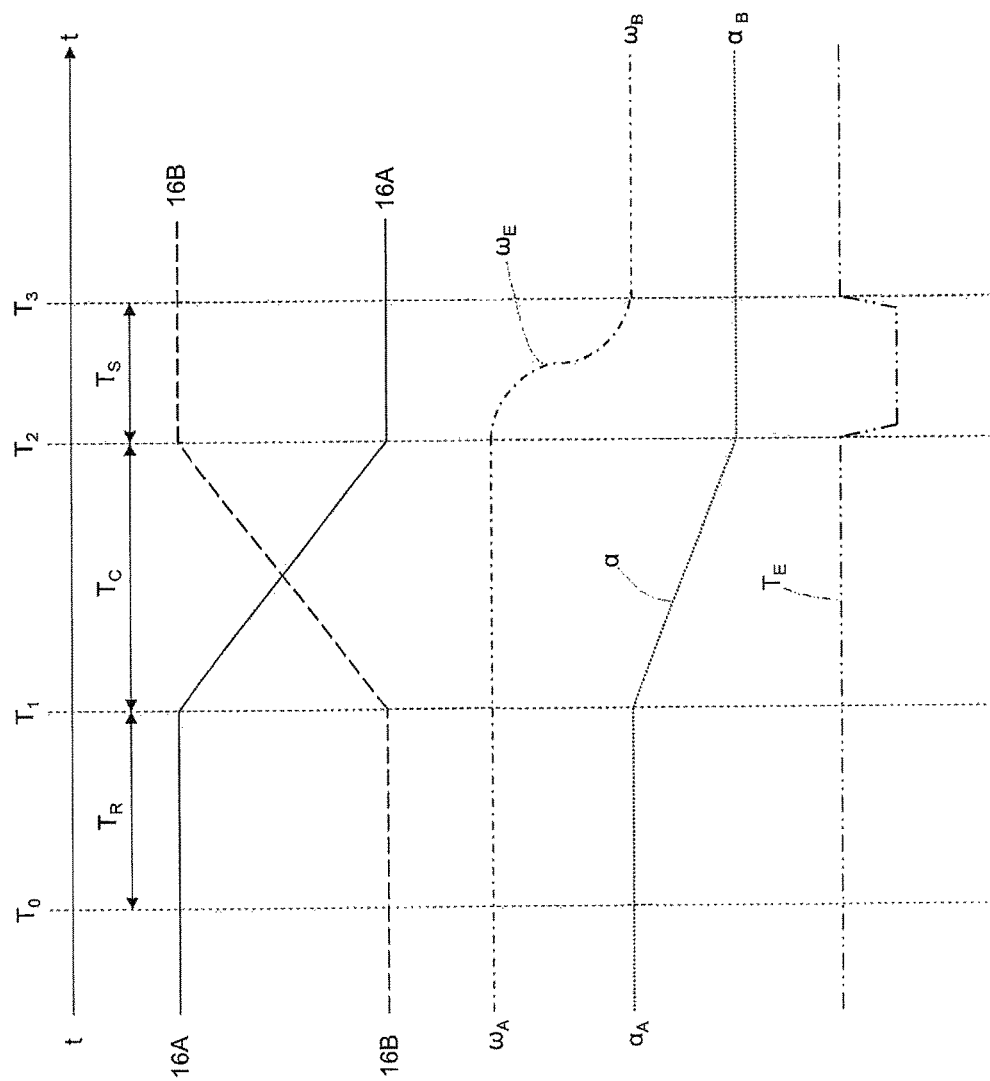
FIG. 3 shows the evolution in time of the torques transmitted by the two clutches of the dual-clutch gearbox, the speed of rotation of a drive shaft of the engine, the longitudinal acceleration of the vehicle and the torque generated by the engine during a conventional gear shift.

The methods for performing a conventional gear shift are illustrated in FIG. 3, in which the driver sends the gear shift command (usually by operating a lever or button arranged on or in proximity of the steering wheel) at the moment $T_0$; FIG. 3 shows, starting from the top, the torques transmitted by the two clutches 16A and 16B, the speed $\omega_E$ of rotation of the drive shaft 5 of the engine 4, the longitudinal acceleration $\alpha$ of the vehicle 1, and the torque $T_E$ generated by the engine 4. As soon as the transmission control unit 12 receives the gear shift command from the driver (moment $T_0$), the transmission control unit 12 immediately starts filling the clutch 16B, that is to say, it immediately starts feeding oil under pressure into the clutch 16B; the clutch 16B associated with the following gear B can in fact only transmit a significant torque to the rear driving wheels 3 when the filling with oil under pressure has been completed and thus since said oil under pressure cannot occupy any further space inside the clutch 16B it exerts a force that stacks the discs of said clutch 16B. Therefore, before the clutch 16B associated with the following gear B can start transmitting a significant torque to the rear driving wheels 3, a certain delay time $T_R$ has to pass (usually between 80 and 220 milliseconds) during which the filling of oil inside the clutch 16B is completed. Normally, the completion of filling of the clutch 16B is monitored by means of a pressure sensor which detects the pressure of the oil inside said clutch 16B: when the pressure of the oil inside the clutch 16B exceeds a given threshold, it means the entire internal volume of the clutch 16B has been filled and the oil inside the clutch 16B starts to be compressed. Thus, the moment $T_1$ in which (when the delay time $T_R$ has elapsed) the clutch 16B is filled with oil and ready to transmit a significant torque is established when the pressure of the oil inside the clutch 16B exceeds the predetermined threshold.

From the moment $T_0$ when the transmission control unit 12 immediately starts closing the clutch 16B until the moment $T_1$ when, the delay time $T_R$ having elapsed, the clutch 16B is filled with oil and ready to transmit a significant torque, nothing happens to the dynamics of the vehicle 1, that is to say the entire torque generated by the engine 4 is transmitted by the clutch 16A just as it was before the start of gear shifting. The command to open the clutch 16A is sent at the moment $T_1$; it is worth noting that there is no delay before the opening of the clutch 16A associated with the current gear A, as the clutch 16A is already filled with oil under pressure and in this step it must only be emptied of part of the oil by opening a solenoid valve (which acts instantaneously).

The transfer of torque between the two clutches 16 occurs between the moments $T_1$ and $T_2$, i.e., the torque transmitted by the clutch 16A gradually decreases and at the same time the torque transmitted by the clutch 16B gradually increases thus causing a crossing of the two clutches 16. Preferably, the clutch 16A is opened within the same time that is necessary for the complete closing of the clutch 16B so as to achieve a symmetric crossing; in this crossing the torque generated by the engine 4 is kept constant, whereas the overall torque transmitted to the rear driving wheels 3 gradually decreases owing to the gradual lengthening of the gear ratio of the gearbox 7 (the clutch 16A is associated with the current gear A which is shorter than the following gear B associated with the clutch 16B). At the moment $T_2$ the clutch 16A is fully open (therefore no longer transmitting torque) while the clutch 16B is completely closed (therefore transmitting the entire engine torque). The interval between the moments $T_1$ and $T_2$ is the shifting time $T_C$, during which the torque transmitted by the clutch 16A decreases until it is zero and the torque transmitted by the clutch 16B increases until reaching the torque $T_E$ generated by the engine 4, that is to say, during which the clutch 16A is separated from the rear driving wheels 3 and the clutch 16B is connected to the rear driving wheels 3.

The speed $\omega_E$ of rotation of the drive shaft 5 of the engine 4 is equal to the speed $\omega_A$ of rotation imposed by the gear ratio of the current gear A before the gear shift, it gradually falls towards the speed $\omega_B$ of rotation imposed by the gear ratio of the following gear B and is equal to the speed $\omega_B$ of rotation after the gear shift. As illustrated in FIG. 3, until the moment $T_2$ when the clutch 16A is fully open, the speed $\omega_E$ of rotation of the drive shaft 5 is equal to (adheres to) the speed $\omega_A$ of rotation imposed by the gear ratio of the current gear A associated with the clutch 16A and is therefore only decreased after the clutch 16A has been fully opened; the aim of such method of controlling the speed $\omega_E$ of rotation of the drive shaft 5 is to prevent the clutch 16A from becoming a brake, i.e. generating a braking torque on the rear driving wheels 3. In order to decrease the speed $\omega_E$ of rotation of the drive shaft 5 of the engine 4 after the complete opening of the clutch 16A, the control unit 11 of the engine 4 temporarily decreases the torque generated by said engine 4, as requested by the control unit 12 of the transmission 6; such temporary decrease in the torque generated by the engine 4 has the effect of decreasing the speed $\omega_E$ of rotation of the drive shaft 5 which passes from the initial value $\omega_A$ imposed by the gear ratio of the current gear A to the final value $\omega_B$ imposed by the gear ratio of the following gear B. It is important to note that the temporary decrease in the torque $T_E$ generated by the engine 4 does not affect the longitudinal acceleration α of the vehicle 1, as the torque transmitted by the clutch 16B to the rear driving wheels 3 remains constant.

The interval between the moments $T_2$ and $T_3$ is the synchronization time $T_S$ during which the speed $\omega_E$ of rotation of the drive shaft 5 of the engine 4 falls from the speed $\omega_A$ of rotation imposed by the gear ratio of the current gear A to the speed $\omega_B$ of rotation imposed by the gear ratio of the following gear B, that is to say, the speed $\omega_E$ of rotation is synchronized with the speed $\omega_B$ of rotation.

The longitudinal acceleration α of the vehicle 1 is in first approximation constant and, equal to the value $\alpha_A$ immediately before the gear shift, gradually decreases towards the value $\alpha_B$ during the gear shift, and is in first approximation constant and equal to the value $\alpha_B$ immediately after the gear shift. The decrease in the longitudinal acceleration α of the vehicle 1 during the gear shift is due to the fact that the torque generated by the engine 4 which remains substantially constant is transmitted with a gradually increasing gear ratio (the gear A is shorter than the gear B) and therefore a decreasing torque is applied to the rear driving wheels 3.

In the gear shift described above, it is apparent that between the moment $T_0$ in which the driver sends the gear shift command and the moment $T_1$ in which the driver feels the gear shift (i.e., notices a decrease in the longitudinal acceleration α of the vehicle 1) the delay time $T_R$ elapses, which from the driver's perspective is a stand-by period with no action (i.e. the undesirable "delay" of the transmission 6 which thus responds "slowly" to the commands sent). In order to give the driver the perception of a more immediately responsive transmission 6 to the gear shift command, it is possible to operate as shown in FIGS. 4-7.

Figure 4:
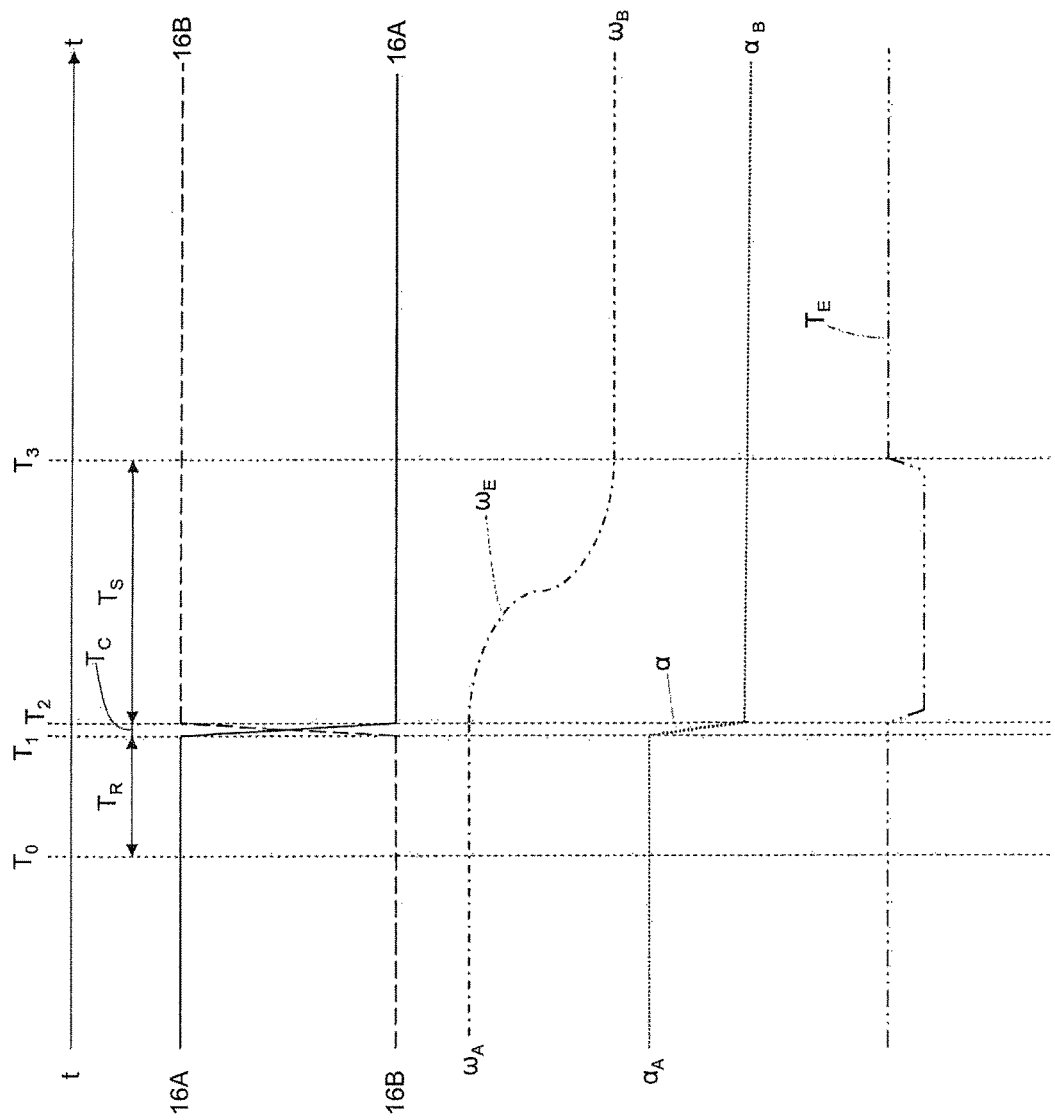

In the embodiment illustrated in FIG. 4, the opening of the clutch 16A is practically instantaneous, in that it takes place at the maximum possible speed by means of a step command (variation); likewise, the closing of the clutch 16B is practically instantaneous, in that it takes place at the maximum possible speed by means of a step command (variation). In other words, when the clutch 16B is ready to transmit a significant torque (that is to say, when the pressure of the oil inside the clutch 16B exceeds the predetermined threshold), the clutch 16B is closed by means of a step command (that is to say, to achieve a target of torque to be transmitted which varies by step, i.e., instantaneously, from zero to the maximum value and is always kept at the maximum value using open-loop control until the clutch 16B is completely closed) and thus at the maximum possible speed and, at the same time, the clutch 16A is opened by means of a step command (that is to say, to achieve a target of torque to be transmitted which varies by step, i.e., instantaneously from the current value to the zero value and is always kept at the zero value using open-loop control until the clutch 16A is completely open) and thus at the maximum possible speed.

Therefore, in the embodiment illustrated in FIG. 4, the shifting time $T_C$ is much shorter than both the delay time $T_R$ and the synchronization time $T_S$; specifically, the shifting time $T_C$ is shorter than 20% (shorter than 15% in some cases) of the synchronization time $T_S$.

In the embodiment illustrated in FIG. 4, the filling of the clutch 16B can be performed extremely quickly, in that it is always possible to supply the greatest possible oil flow rate to the clutch 16B (constantly, for the entire filling operation): indeed, at the moment $T_1$ there is no need for any precise control of the position of the clutch 16B, as the clutch 16B must be completely closed at the maximum possible speed (thus with the filling solenoid valve completely open and a substantially open-chain control). In other words, according to the embodiment illustrated in FIG. 3, at the moment $T_1$ a fine-tuned and precise control of the position of the clutch 16B is required in order to close the clutch 16B gradually and relatively slowly following a relatively slow ramp to achieve the target; therefore, the filling of the clutch 16B must be controlled (i.e., by throttling the flow rate specifically in proximity of the moment $T_1$) and thus performed more slowly (that is to say, the maximum possible flow rate cannot be used all the time and the oil flow rate must be throttled so as to always maintain precise control of the dynamics of the clutch 16B). On the contrary, in the embodiment illustrated in FIG. 4, at the moment $T_1$ the clutch 16B must be completely closed at the maximum possible speed, so there is no need to maintain a fine-tuned and precise control of the position of the clutch 16B; as a consequence, the filling of the clutch 16B can be performed rapidly in "abundance" by always supplying the greatest possible oil flow rate.

In the embodiment illustrated in FIG. 4 the delay time $T_R$ required for filling the clutch 16B is approximately 80-100 milliseconds, whereas in the embodiment illustrated in FIG. 3 the delay time $T_R$ required for filling the clutch 16B is approximately 220-250 milliseconds. In other words, the precise and controlled filling of the clutch 16B (that is to say, with closed-chain control of the oil supply) takes approximately 120-140 milliseconds longer than the uncontrolled filling of the clutch 16B at the greatest possible oil flow rate (that is to say, with open-chain control of the oil supply).

To sum up, the current command of the solenoid valve that controls the filling of the clutch 16B may be appropriately operated to significantly reduce the time required for filling: nominal filling (the duration of which in time is a value of between 100 ms and 220 ms and is equal to the delay time $T_R$ comprised between the moments $T_0$ and $T_1$) permits the achievement of considerable precision in the torque transmitted by the clutch 16B as the steps in which the clutch 16B starts transmitting the torque and the step in which the transmitted torque gradually increases are separate. On the other hand, when the solenoid valve that controls the filling of the clutch 16B is set to a value equal (or close) to the maximum available value the filling time of the clutch 16B can be reduced by up to less than 65-75 ms (a time of 65-75 ms between the moments $T_0$ and $T_2$ is in fact necessary, so for a time interval greater than just the delay time $T_R$ which is comprised between the moments $T_0$ and $T_1$); in this way the steps in which the clutch 16B starts transmitting torque and the step in which the transmitted torque gradually increases overlap (in other words, the clutch 16B transmits the maximum torque in the same moment as when it starts transmitting torque). Furthermore, the clutch 16A must be opened instantaneously the moment the filling of the clutch 16B is completed; in order to achieve an instantaneous reduction in the torque of the clutch 16A an appropriate solenoid valve is operated to empty said clutch 16A.

In other words, upon receiving the gear shift command, the solenoid valve of the clutch 16B is arranged and held in a completely open filling position (i.e. an oil input position) with open-loop control so that the clutch 16B is filled with oil that is always supplied at the greatest possible oil flow rate from the start until the end of filling; at the same time, the moment in which the oil filling in the clutch 16B ends is detected as previously described in detail. As soon as the oil filling in the second clutch 16B ends, said clutch 16B is completely closed at the maximum possible speed (that is to say, continuing to keep the solenoid valve of the clutch 16B in the completely open filling position with open-loop control); in other words, there is no break between the oil filling in the clutch 16B and the closing of the clutch 16B as the solenoid valve of the clutch 16B is always kept (without any variation) in the completely open filling position with open-loop control both during the oil filling in the clutch 16B and during the subsequent closing of the clutch 16B. Moreover, as soon as the oil filling in the clutch 16B ends (thus with the closing of the clutch 16B), the solenoid valve of the clutch 16A is arranged and maintained in a completely open emptying position (i.e. an oil output position) with open-loop control so that the clutch 16A is emptied of the oil by always extracting the greatest possible oil flow rate from the start to the end of emptying.

In this embodiment the precise and optimal synchronization of the actuation of the two clutches 16A and 16B is very important: lack of synchronization of the opening and closing of the two clutches 16A and 16B could result in a torque hole (if the clutch 16A is opened too soon with respect to the closing of the clutch 16B), or in blocking of the rear axle (if the clutch 16A is opened too late with respect to the closing of the clutch 16B).

Thus, operating as illustrated in FIG. 4, the driver notices a much faster (more immediate) response to his/her request to shift gear, as the delay time $T_R$ (that is to say, the time that elapses between when the request to shift gear is sent at the moment $T_0$ and a change in the dynamics of the vehicle 1 at the moment $T_1$) is significantly reduced (by more than 60%).

Figure 5:
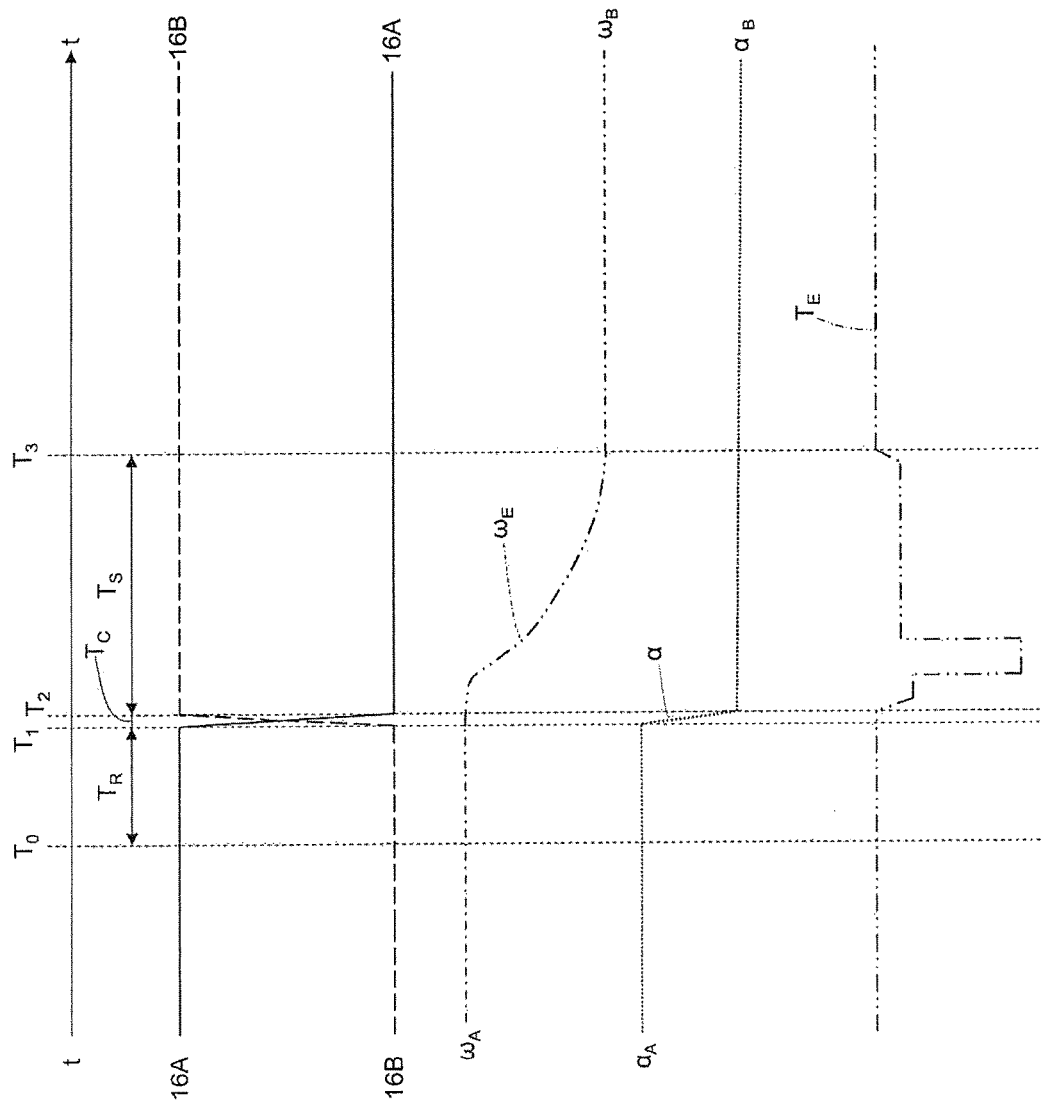

According to a possible embodiment illustrated in FIG. 5, between the moments $T_2$ and $T_3$, that is to say, during the synchronization time $T_S$, the engine 4 is made to operate in cut-off (i.e., with the fuel supply completely cut off and thus with the maximum available engine braking) for a limited period of time; when the engine 4 is made to operate in cut-off, the speed $\omega_E$ of rotation of the drive shaft 5 suddenly falls, producing a "pleasant" noise that is greatly appreciated by drivers during high-performance driving. During a normal gear shift to adjust the speed $\omega_E$ of rotation of the drive shaft 5 to the new gear ratio in a controlled manner during the synchronization time $T_S$, the control unit 11 of the engine 4 follows the torque and speed references imposed by the control unit 12 of the transmission 6. There are usually no discontinuities in the torque profile so that the engine speed can be reduced gradually; however, in order to achieve an exhaust noise typical of racing cars and at the same time the fastest possible synchronization of speed, the torque profile is created so that in a given step in the synchronization time $T_S$ the torque profile is instantaneously reduced to zero (by means of a step variation) to make the engine 4 operate in cut-off and then instantaneously restored (by means of a step variation) to the previous value.

Figure 6:
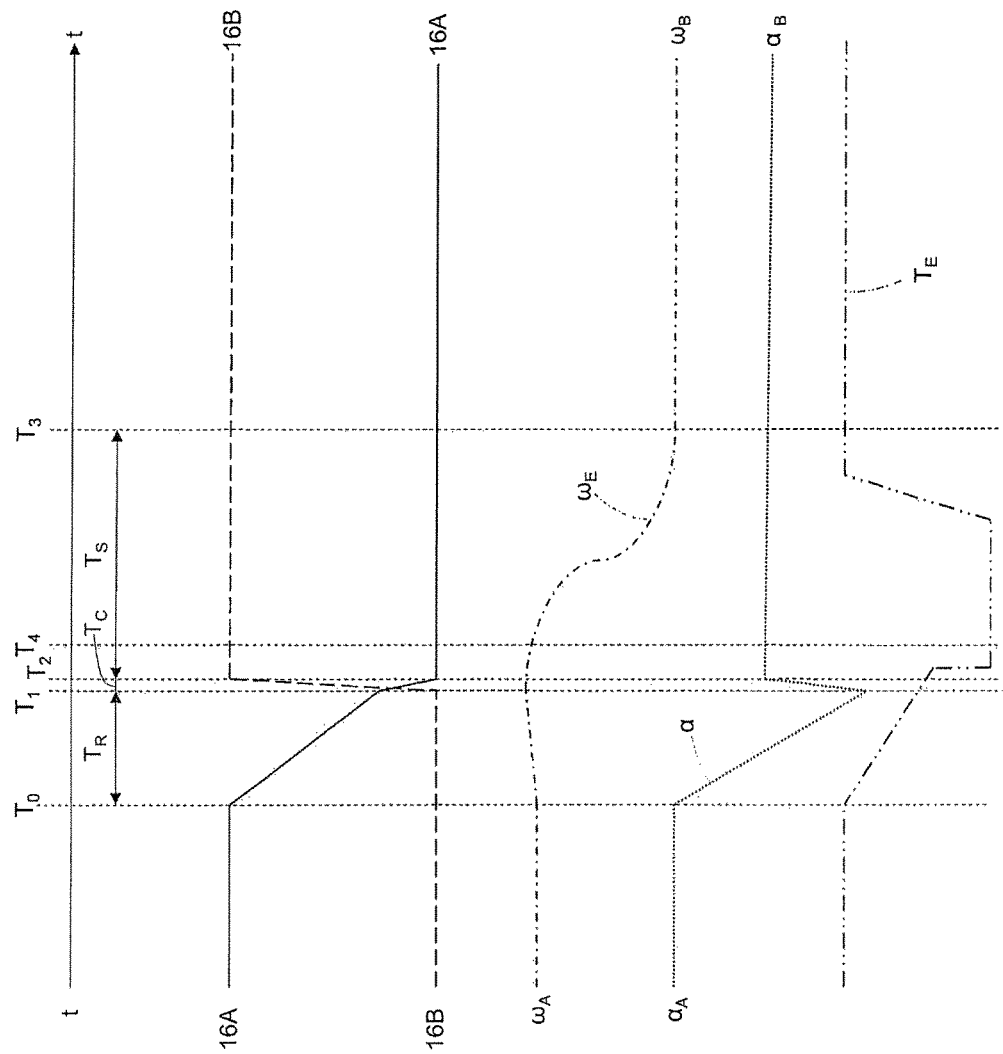

FIG. 6 shows an alternative embodiment of the gear shift operation illustrated in FIGS. 4 and 5, in which the opening of the clutch 16A does not start at the moment $T_1$ when the clutch 16B starts transmitting torque, but in advance of the moment $T_1$, i.e., it starts before the clutch 16B starts transmitting torque. The method of performing the gear shift illustrated in FIG. 6 has been named "SIAMT"; this name stands for "SImulated AMT" and was chosen as the behaviour of a single-clutch gearbox is simulated, at least in part, by means of a dual-clutch gearbox only in order to change the driving perceptions felt by the driver.

The advance in the opening of the clutch 16A is variable and may occur as a lower limit at the moment $T_0$ (as shown in FIG. 6) or may occur at a moment between the moment $T_0$ and the moment $T_1$. In this manner, the driver feels that the transmission 6 responds extremely quickly to his/her gear shift command sent at the moment $T_0$ (i.e., after a short delay time) and even instantaneously when the opening of the clutch 16A starts at the moment $T_0$ as shown in FIG. 6. It is worth noting that there is no high-performance interest in opening the clutch 16A in advance of the moment $T_1$ in that the torque transmitted to the rear driving wheels 3 is reduced (thus, the torque $T_E$ generated by the engine 4 must also be reduced, as illustrated in FIG. 6, to avoid excessive acceleration of the drive shaft 5); however, the opening of the clutch 16A in advance of the moment $T_1$ is perceived by the driver as immediate responsiveness which is greatly appreciated, especially in high-performance driving.

In order to keep the speed $\omega_E$ of rotation of the drive shaft 5 substantially constant (a slight increase is actually allowed) and equal to the initial value $\omega_A$ when the opening of the clutch 16A is performed in advance, the torque generated by the engine 4 must be temporarily cut off; such cutting off of the torque generated by the engine 4 is performed by the control unit 11 of the engine 4 upon a request of the control unit 12 of the transmission 6 and inevitably leads to a temporary decrease in the longitudinal acceleration α of the vehicle 1 which is clearly visible in FIG. 6. Specifically, during the entire gear shift, i.e., from the starting moment of the opening of the clutch 16A corresponding to the current gear A until the moment $T_3$ of complete closing of the clutch 16B corresponding to the following gear B, the control unit 12 of the transmission 6 determines a target torque $T_{E-TAR}$ of the engine 4; the control unit 12 of the transmission 6 notifies the control unit 11 of the engine 4 of the target torque $T_{E-TAR}$ of the engine 4 by means of the BUS line 13 and/or by means of the dedicated synchronization cable 14, so that the control unit 11 of the engine 4 controls the engine 4 to pursue the target torque $T_{E-TAR}$ of the engine 4.

The temporary fall in the longitudinal acceleration α of the vehicle 1 after the advanced opening of the clutch 16A is clearly negative from the standpoint of pure performance, but is not perceived as so negative by the driver, as the average driver used to the sensations transmitted by a conventional single-clutch gearbox expects to feel a "torque hole" (i.e., an "acceleration gap") during an upward gear shift followed by an increase in the engine torque (i.e., in acceleration) at the end of the upward gear shift. The temporary fall in the longitudinal acceleration α of the vehicle 1 after the advanced opening of the clutch 16A gives the driver exactly the same feeling as a traditional single-clutch gearbox (i.e., what the driver expects): when the upward gear shift command is sent, a "torque hole" (i.e., an "acceleration gap") is felt followed by an increase in the engine torque (i.e., in acceleration) at the end of the upward gear shift. On the contrary, in a standard gear shift of a dual-clutch gearbox (illustrated for example in FIG. 3), during an upward gear shift the driver only notices a gradual reduction in the longitudinal acceleration α of the vehicle 1 owing to the gradual lengthening of the gear ratio of the torque generated by the engine 4; said method of gear shifting is actually better in terms of performance, but the majority of drivers experience exactly the opposite, and consider it detrimental to performance.

The moment at which to start the opening of the clutch 16A is decided according to the desired speed of reaction to the gear shift command, i.e., how quickly the driver should feel an action of the transmission 6 after sending the gear shift command at the moment $T_0$. In other words, the greater the desire to increase the driver's perception of responsiveness of the transmission 6 to the gear shift command, the closer the moment at which the opening of the clutch 16A starts must be to the moment $T_0$. Nonetheless, it is worth underlining that in terms of performance and also in terms of the sensations felt by the driver, it is not always convenient to start the opening of the clutch 16A very much in advance (that is to say, it is not always convenient to start the opening of the clutch 16A immediately after the moment $T_0$). As shown in FIG. 6, the clutch 16A performs draining (that is to say, emptying) in two successive ramps which also have different gradients so that the sum of the torques transmitted by the two clutches 16A and 16B (in other words, the total torque transmitted to the rear driving wheels 3) is always positive (otherwise the mechanics of the gearbox 7 could trigger oscillations due to the many spaces in the system); if the overall torque is moderate (in other words, when the vehicle 1 is driven gently) and the moment in which the opening of the clutch 16A starts is too far in advance, the initial downward gradient of the torque transmitted by the clutch 16A will be low and thus substantially hardly perceived by the driver or not perceived at all; in this case it is more advantageous not to anticipate the moment in which the opening of the clutch 16A starts by too much, in order to obtain a higher initial downward gradient of the torque transmitted by the clutch 16A which will therefore be felt by the driver.

As mentioned above, the opening of the clutch 16A in advance determines a degradation of performance as the more this is anticipated the more the torque generated by the engine 4 must be cut off; on the contrary, in a standard gear shift with a dual-clutch gearbox (illustrated for example in FIG. 3) the torque generated by the engine 4 is always kept constant with no need for it to be cut off. However, the actual degradation of performance determined by the opening of the clutch 16A in advance is felt in exactly the opposite way by the driver as an improvement in performance. In other words, for the majority of drivers a gear shift in which the opening of the clutch 16A is done in advance is better in terms of performance than a standard gear shift. It is worth noting that drivers' opinions must be held in high regard, even when technically wrong, since the vast majority of drivers will buy a car on the basis of their own perceptions and beliefs, rather than objective criteria; in other words, since drivers want to get as much pleasure as possible from driving and do not have to win competitions, they will choose to buy the vehicle which they believe to be more "fun to drive" and "high-performance" rather than the vehicle which is actually faster.

As described above, in order to decrease the speed $\omega_E$ of rotation of the drive shaft 5 of the engine 4 after the complete opening of the clutch 16A (i.e., after the moment $T_2$), the control unit 11 of the engine 4 temporarily decreases the torque $T_E$ generated by the engine 4 upon the request of the control unit 12 of the transmission 6, while maintaining the torque transmitted by the clutch 16B constant; consequently, a difference is created between the torque $T_E$ generated by the engine 4 and the torque transmitted by the clutch 16B (which is higher than the torque $T_E$ generated by the engine 4), and such difference has the effect of decreasing the speed $\omega_E$ of rotation of the drive shaft 5 which passes from the initial value $\omega_A$ imposed by the gear ratio of the current gear A to the final value $\omega_B$ imposed by the gear ratio of the following gear B. In other words, both the mechanical power generated by the engine 4 and part of the kinetic energy of the drive shaft 5, which thus slows down, are transferred to the rear driving wheels 3 for a short period. It is important to note that the temporary decrease in the torque $T_E$ generated by the engine 4 does not affect the longitudinal acceleration α of the vehicle 1, as the torque transmitted by the clutch 16B to the rear driving wheels 3 remains constant.

Figure 7:
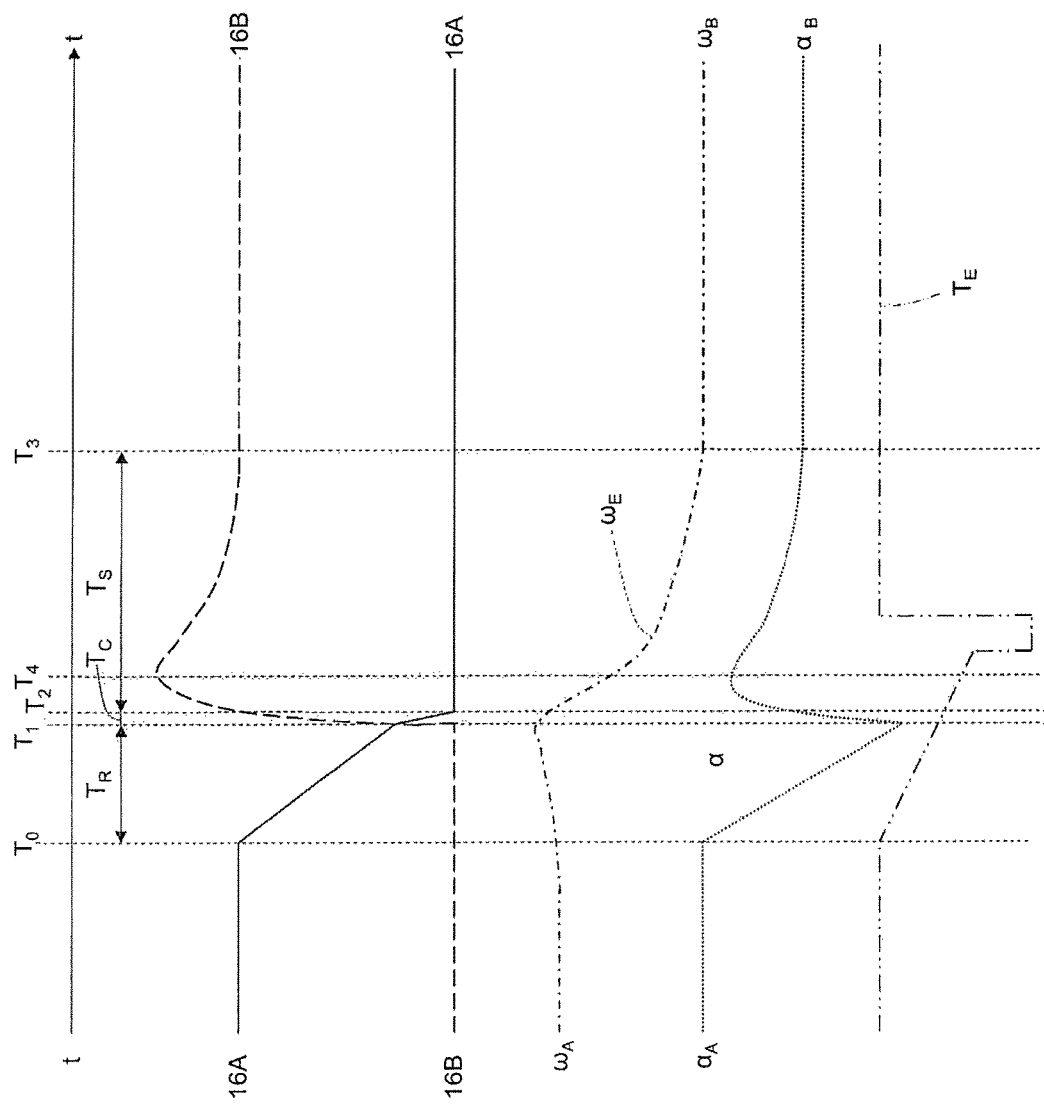

According to the variant shown in FIG. 7, in high-performance driving (i.e., when the achievement of a high acceleration performance is desired) in order to decrease the speed ox of rotation of the drive shaft 5 of the engine 4 after the complete opening of the clutch 16A (i.e., after the moment $T_2$), the torque $T_E$ generated by the engine 4 is increased (with respect to the control method illustrated in FIG. 6) and the clutch 16B is temporarily over-lengthened, thus increasing the oil pressure in order to transfer more torque to the rear driving wheels 3. Thus, the clutch 16B is controlled to temporarily transmit a torque that is greater than the torque to be transmitted by the clutch B immediately after the gear shift and than the torque transmitted by the clutch 16A immediately before the gear change. In other words, in the case of high-performance driving, to generate a negative differential between the torque $T_E$ generated by the engine 4 and the torque transmitted by the clutch 16B so as to slow down the drive shaft 5 instead of decreasing the torque $T_E$ generated by the engine 4 (more significantly) by keeping the torque transmitted by the clutch 16B constant, the torque transmitted by the clutch 16B is increased and the cutting off of the torque $T_E$ generated by the engine 4 is avoided or reduced. In other words, the clutch 16B is controlled to transmit to the rear driving wheels 3 a higher torque than the torque $T_E$ generated by the engine 4, so as to gradually reduce the speed $\omega_E$ of rotation of the drive shaft 5 from the initial value $\omega_A$ to the final value $\omega_B$; in this situation, the clutch 16B is controlled to transmit to the rear driving wheels 3 both the torque $T_E$ generated by the engine 4, and a further (extra) torque generated by the reduction of the kinetic energy of the drive shaft 5 (i.e., generated by the slowing down of the drive shaft 5). As is apparent in FIG. 7, the above-described method of temporarily over-lengthening the clutch 16B makes it possible to increase acceleration performance: between the moments $T_2$ and $T_3$ the temporary increase in the engine torque delivered to the rear driving wheels 3 results in a corresponding temporary increase in the longitudinal acceleration α. Moreover, the above-described method of temporarily over-lengthening the clutch 16B means the synchronization time $T_S$ can be significantly reduced, which also contributes towards creating a feeling of sportiness.

The best possible performance can be achieved by combining a substantial over-lengthening of the clutch 16B without any cutting off of the torque $T_E$ generated by the engine 4 (that is to say, the torque $T_E$ generated by the engine 4 is always kept constant during the entire gear shifting operation). It is worth noting that the above-mentioned method of temporarily over-lengthening the clutch 16B achieves benefits in terms of improved performance but also results in a slight lessening of driving comfort as the increase and subsequent decrease in the longitudinal acceleration α within a short time (approximately 80-150 milliseconds) result in an oscillatory movement of the head of the vehicle's occupants around the "hinging" of the neck. The vehicle's occupants perceive the movements of the head backwards (when the longitudinal acceleration α increases) and forwards (when the longitudinal acceleration α decreases) as uncomfortable when these do not occur during high-performance driving. Thus, the above-described method of temporarily over-lengthening the clutch 16B is only used when the highest possible performance is sought in sports driving.

In order to reduce the loss of comfort resulting from the above-described temporary over-lengthening of the clutch 16B without however sacrificing all the benefits in terms of performance, the time for which the clutch 16B is over-lengthened can be increased; in other words, the clutch 16B is over-lengthened to transmit an additional lower torque over a longer time. In this way the step of longitudinal acceleration α of the vehicle 1 is reduced (but not eliminated) and is therefore less noticeable by the occupants of the vehicle 1.

FIGS. 4-7 show an upward gear shift in which the current gear A is shorter than the following gear B. The method of performing the gear shift described above may also be applied in an entirely equivalent manner to a downward gear shift in which the current gear A is longer than the following gear B as illustrated in FIGS. 8 and 9, provided the road vehicle 1 is slowing down (i.e., when the torque $T_E$ generated by the engine 4 is zero and not for example in the case of "kickdown" when the torque $T_E$ generated by the engine 4 is significantly more than zero). FIG. 8 shows a downward gear shift in which the clutch 16B is filled with oil which is always supplied at the maximum possible oil flow rate; this downward gear shift is exactly the same as the upward gear shift illustrated in FIG. 4, with the difference that in the downward gear shift the longitudinal acceleration α is negative, the engine 4 does not generate torque $T_E$ (that is to say, the torque $T_E$ is normally zero), and during gear shifting the driving shaft 5 of the engine 4 accelerates instead of slowing down. FIG. 9 shows a downward gear shift that differs from the downward gear shift illustrated in FIG. 8 for the fact that, after the complete closing of the clutch 16B, the clutch 16B is controlled to temporarily over-lengthen and thus transmit a torque that is greater than the torque to be transmitted by the clutch 16B immediately after the gear shift and than the torque transmitted by the clutch 16A immediately before the gear change; in this way, the torque needed to make the drive shaft 5 accelerate is "drawn" from the motion of the road vehicle 1 and there is no need to activate the engine 4 during the synchronization time $T_S$ (as is the case in the example illustrated in FIG. 8). The strategy illustrated in FIG. 9 is more energy efficient, since the engine 4 is not required to generate any torque $T_E$ and therefore no fuel is used during gear shifting.

Generally speaking, during the synchronization time $T_S$ the generation of torque $T_E$ by the engine 4 (as illustrated in FIG. 8) and the temporary over-lengthening of the clutch 16B (as illustrated in FIG. 9) may be combined to increase the speed $\omega_E$ of rotation of the drive shaft 5 of the engine 4 following the shortening of the gear ratio of the gearbox 9; this combination makes it possible to temporarily apply an additional braking force to the rear driving wheels 3 (due to the effect of the temporary over-lengthening of the clutch 16B) which is generally appreciated by the driver, and to obtain a noise of the engine 4 (owing to the temporary generation of torque $T_E$ by the engine 4) which is also generally appreciated by the driver.

Several methods for carrying out a gear shift have been described: filling of the clutch 16B by always supplying the maximum possible oil flow rate and successive closing of the clutch 16B and opening of the clutch 16B at the highest possible speed (known as the "superfill" method and illustrated in the embodiments illustrated in FIGS. 4-9); the engine 4 is made to operate in cut-off during the synchronization time $T_S$, that is to say, when the speed $\omega_E$ of rotation of the drive shaft 5 of the engine 4 falls from the speed $\omega_A$ of rotation imposed by the gear ratio of the current gear A to the speed $\omega_B$ of rotation imposed by the gear ratio of the following gear B (known as the "torque hole" method and illustrated in the embodiments shown in FIGS. 5, 6 and 7); controlling the clutch 16B following the complete closing of the clutch 16B so as to allow said clutch 16B to temporarily transmit a torque that is greater than the torque to be transmitted by the second clutch 16B immediately after the gear shift and than the torque transmitted by the clutch 16A immediately before the gear shift (known as the "overtorque" method and illustrated in the embodiments shown in FIGS. 7 and 9); and partially opening the clutch 16A before the oil filling in the second clutch 16B ends and before the closing of the clutch 16B starts (known as the "emptying of the deactivated clutch" method and illustrated in the embodiments shown in FIGS. 6 and 7).

According to a preferred embodiment, the control unit 12 of the transmission 6 selectively uses the different methods of performing a gear shift described above ("superfill", "torque hole", "overtorque", "emptying of deactivated clutch") according to the current driving style, that is to say, if the vehicle 1 is being driven in comfort mode, energy efficiency mode, sports driving mode or racing driving mode. The current driving style may be determined directly by the driver by operating a specific control knob (known under the trade name of "manettino"), it may be determined automatically according to the motion of the vehicle 1 (specifically as a function of the speed and longitudinal and lateral acceleration of the vehicle 1), or it may be determined according to both the selection made by the driver and the motion of the vehicle 1.

When the comfort driving style is selected, the control unit 12 of the transmission 6 performs the upward gear shifts (that is to say, gear shifts during acceleration to lengthen the gear ratio) using the "superfill" method only (i.e., without using the "torque hole", "overtorque" or "emptying of deactivated clutch" methods) and thus operates as illustrated in FIG. 4. This method guarantees the precision of the gear shifting manoeuvre with a monotonic acceleration from the initial value to the final value; shifting is extremely comfortable and also fast since the response time to the gear shift command (that is to say, the delay time $T_R$) is considerably shorter than that achieved with a conventional gear shift.

When the energy efficiency driving style is selected (maximum reduction of fuel consumption), the control unit 12 of the transmission 6 performs the upward gear shifts (that is to say, gear shifts during acceleration to lengthen the gear ratio) using the "superfill" and "overtorque" methods (i.e., without using the "torque hole" and "emptying of deactivated clutch" methods); this embodiment is illustrated in FIG. 9 with reference to a downward gear shift (namely, a gear shift during deceleration to shorten the gear ratio) and can easily be applied to an upward gear shift based on that illustrated in FIG. 6 and adding the "overtorque" method. With this method the gear shift is performed without wasting any of the energy generated by the engine 4: during the synchronization time $T_S$ (that is to say, during the step of synchronizing the speed $\omega_E$ of rotation of the drive shaft 5 of the engine 4 with the speed $\omega_B$ of rotation imposed by the gear ratio of the following gear B) the mechanical energy generated by the engine 4 and part of the kinetic energy of the drive shaft 5 of the engine 4, which thus slows down, is transmitted to the rear driving wheels 3. Gear shifting is extremely comfortable as well as fast since the response time to the gear shift command (that is to say, the delay time $T_R$) is considerably shorter than that achieved with a conventional gear shift; furthermore, thanks to the over-lengthening of the clutch 16B, the speed $\omega_E$ of rotation of the drive shaft 5 of the engine 4 adapts more quickly to the speed $\omega_B$ of rotation imposed by the gear ratio of the following gear B (that is to say, the synchronization time $T_S$ is shorter than with a conventional gear shift) and this is seen by the driver as evidence of the sportiness of the entire gear shifting event.

When the sports driving style is selected, the control unit 12 of the transmission 6 performs the upward gear shifts (that is to say, gear shifts during acceleration to lengthen the gear ratio) using the "superfill" and "emptying of deactivated clutch" methods (in other words, without using the "torque hole" or "overtorque" methods); this embodiment is not illustrated and can easily be understood starting from that illustrated in FIG. 6 and removing the "torque hole" method. With this method it is possible to achieve an acceleration profile with high time derivatives that make the vehicle 1 aggressive without undermining driving precision. The "emptying of deactivated clutch" method, though not ideal in terms of longitudinal acceleration, makes gear shifting a particularly exciting experience for the driver that is much appreciated.

When the sports driving style is selected, the control unit 12 of the transmission 6 could also perform the upward gear shifts (that is to say, gear shifts during acceleration to lengthen the gear ratio) using the "torque hole" method, that is to say, using the "superfill", "emptying of deactivated clutch" and "torque hole" methods together (i.e., without using the "overtorque" method) and thus operate as illustrated in FIG. 6. This method achieves two positive aspects: the speed $\omega_E$ of rotation of the drive shaft 5 of the engine 4 adapts more quickly to the speed $\omega_B$ of rotation imposed by the gear ratio of the following gear B (i.e., the synchronization time $T_S$ is shorter than with a conventional gear shift) and, above all, the exhaust noise is entirely similar to the exhaust noise typical of racing cars.

When the racing driving style is selected (generally for driving on race tracks), the control unit 12 of the transmission 6 could perform the upward gear shifts (that is to say, gear shifts during acceleration to lengthen the gear ratio) using all four methods, ("superfill", "emptying of deactivated clutch", "torque hole" and "overtorque") and thus operate as illustrated in FIG. 7. In this way gear shifting is fast thanks to the effect of the "superfill" method (reduction of the delay time $T_R$) and thanks to the effect of the "torque hole" method (reduction of the synchronization time $T_S$), sporty thanks to the effect of the "emptying of deactivated clutch" method (which achieves an acceleration profile with high time derivatives), efficient thanks to the effect of the "overtorque" method (which recovers part of the kinetic energy of the drive shaft 5 of the engine 4), and exciting thanks to the effect of the "torque hole" method (which makes the noise of the exhaust entirely similar to that typical of racing vehicles).

When the comfort driving style is selected, the control unit 12 of the transmission 6 performs the downward gear shifts (that is to say, gear shifts during deceleration to shorten the gear ratio) using the "superfill" and "overtorque" methods (i.e., without using the "torque hole", or "emptying of deactivated clutch" methods) and thus operates as illustrated in FIG. 9. This guarantees the precision of the gear shifting manoeuvre with a monotonic deceleration from the initial value to the final value; gear shifting is extremely comfortable (especially in terms of the noise level, as the engine 4 is always deactivated) and also fast since the response time to the gear shift command (that is to say, the delay time $T_R$) is considerably shorter than that achieved with a conventional gear shift. In this situation, the control unit 12 of the transmission 6 could request the activation of the engine 4 to generate a torque in order to reduce any discontinuities in longitudinal acceleration to a minimum during the synchronization of the speed $\omega_E$ of rotation of the drive shaft 5 of the engine 4 and the speed $\omega_B$ of rotation imposed by the gear ratio of the following gear B; of course, in this situation, the engine 4 is controlled to reduce the noise of the exhaust to a minimum, which could affect the speed of the manoeuvre, i.e., by having to make the synchronization time $T_S$ longer.

When the energy efficiency driving style is selected (maximum reduction of fuel consumption), the control unit 12 of the transmission 6 performs the downward gear shifts (that is to say, gear shifts during deceleration to shorten the gear ratio) using the "superfill" and "overtorque" methods (that is to say, without using the "torque hole", or "emptying of deactivated clutch" methods) and thus operates as illustrated in FIG. 9. With this method the gear shift is completed without activating the engine 4: during the synchronization time $T_S$ (that is to say, during the step of synchronizing the speed $\omega_E$ of rotation of the drive shaft 5 of the engine 4 with the speed $\omega_B$ of rotation imposed by the gear ratio of the following gear B), only the kinetic energy of the drive shaft 5 of the engine 4, which thus slows down, is transmitted to the rear driving wheels 3. Gear shifting is extremely comfortable and also fast since the response time to the gear shift command (that is to say, the delay time $T_R$) is considerably shorter than that achieved with a conventional gear shift.

When the sports or racing driving style is selected, the control unit 12 of the transmission 6 performs the downward gear shifts (that is to say, gear shifts during deceleration to shorten the gear ratio) using the "superfill" method (i.e., without using the "torque hole", "overtorque" or "emptying of deactivated clutch" methods) and thus operates as illustrated in FIG. 8. Alternatively, the control unit 12 of the transmission 6 could perform the downward gear shifts also partially using the "overtorque", method, in other words, the synchronization of the speed $\omega_E$ of rotation of the drive shaft 5 of the engine 4 with the speed $\omega_B$ of rotation imposed by the gear ratio of the following gear B is performed partly by using the kinetic energy of the vehicle 1 (as an effect of the "overtorque" method) and partly using the torque generated by the engine 4 which is activated; this control logic is not illustrated but can easily be applied by combining that illustrated in FIGS. 8 and 9 (of course, both the engine torque generated by the "overtorque" method, and the torque generated by the engine 4 are reduced as, since they are both present, they contribute together to accelerate the drive shaft 5 of the engine 4). Gear shifting is perceived as fast since the response time to the gear shift command (in other words, the delay time $T_R$) is considerably shorter than that achieved with a conventional gear shift. Furthermore, when the engine 4 is activated, the noise that is generated gives the vehicle 1 an aggressiveness typical of sports cars. Clearly, in this situation the engine 4 is controlled both to reduce the synchronization time $T_S$ to a minimum (that is to say, to complete the gear shift as quickly as possible) and to accentuate the noise of the exhaust; specifically, the racing driving style envisages carrying the speed of the manoeuvre and the noise of the exhaust to the extreme.

To sum up, the control method for carrying out a gear shift described above has numerous advantages.

Firstly, with the control method for carrying out a gear shift described above the driver perceives the extreme responsiveness of the transmission 6 to the gear shift commands and has a sensation of high performance.

Secondly, the control method for carrying out a gear shift described above is simple and inexpensive to implement as it does not require the installation of additional physical components and does not involve upgrading of the control unit 12 of the transmission 6 since it does not require significant additional computing capacity.

The invention claimed is:

1. A control method for carrying out a gear shift in a transmission provided with a dual-clutch gearbox, so as to shift from a current gear to a following gear;
   wherein the dual-clutch gearbox has two primary shafts, at least one secondary shaft connected to drive wheels, and a first clutch and a second clutch;
   wherein each first or second clutch is interposed between a drive shaft of an engine and a corresponding primary shaft, is in an oil bath and is pressure-controlled, namely a degree of opening/closing of the first or second clutch is determined by the pressure of the oil inside of said first or second clutch;
   wherein each first or second clutch comprises at least one solenoid valve which controls input of oil into the first or second clutch and controls output of oil from the first or second clutch;
   the control method comprises the steps of:
   receiving a gear-shift command;
   opening the first clutch associated with the current gear;
   filling with oil the second clutch associated with the following gear after receiving the gear-shift command;
   closing the second clutch as soon as the oil filling ends;
   after receiving the gear-shift command, arranging and maintaining the solenoid valve of the second clutch in a completely open filling position with open-loop control so that the second clutch is filled with oil supplied at a greatest possible oil flow rate from start to end of the filling and the second clutch is subsequently closed, maintaining the solenoid valve in the completely open filling position until said second clutch is completely closed;
   detecting the moment in which oil filling in the second clutch ends and thus the closing of the second clutch starts; and
   as soon as the oil filling in the second clutch ends, arranging and maintaining the solenoid valve of the first clutch in a completely open emptying position with open-loop control so that the first clutch is emptied of the oil, and is then opened, extracting the greatest possible oil flow rate from start to end of emptying.

2. The control method according to claim 1 further comprising the steps of:
   determining the oil pressure on an inside of the second clutch; and
   establishing that the oil filling in the second clutch has ended when the oil pressure on the inside of the second clutch exceeds a threshold.

3. The control method according to claim 1, further comprising the step of adjusting torque ($T_E$) generated by the engine after the complete opening of the first clutch, so as to synchronize speed ($\omega_E$) of rotation of the drive shaft with speed ($\omega_B$) of rotation imposed by a gear ratio of the following gear.

4. The control method according to claim 3, wherein the engine is caused to operate in cut-off for a limited amount of time during the synchronization between the speed ($\omega_E$) of rotation of the drive shaft and the speed ($\omega_B$) of rotation imposed by the gear ratio of the following gear.

5. The control method according to claim 4, wherein the engine is caused to operate in a cut-off condition by reducing to zero and subsequently restoring a target of the torque ($T_E$) generated by the engine by means of a step variation.

6. The control method according to claim 4, in a case of upshifting, further comprising the steps of:
    determining whether a driving style is a sports driving style or a racing driving style; and
    causing the engine to operate in a cut-off condition during the synchronization between the speed ($\omega$E) of rotation of the drive shaft and the speed ($\omega_B$) of rotation imposed by the gear ratio of the following gear, only in a case of sports or racing driving style.

7. The control method according to claim 1, wherein a shifting time ($T_C$), during which the first clutch is completely opened at a maximum possible speed and the second clutch is completely closed at a maximum possible speed, is shorter than a successive synchronization time ($T_S$), during which the speed ($\omega_E$) of rotation of the drive shaft is synchronized with the speed ($\omega_B$) of rotation imposed by the gear ratio of the following gear.

8. The control method according to claim 7, wherein the shifting time ($T_C$) is shorter than 20% of the synchronization time ($T_S$).

9. The control method according to claim 1, further comprising the step of opening the first clutch only at the end of the oil filling in the second clutch and as the second clutch is closed.

10. The control method according to claim 1, further comprising the step of partially opening the first clutch before the end of the oil filling in the second clutch and in advance of the closing of the second clutch.

11. The control method according to claim 10, further comprising a step of cutting a torque ($T_E$) generated by the engine as the first clutch is partially opened, so as to keep a speed ($\omega_E$) of rotation of the drive shaft constant and equal to an initial value ($\omega_A$) until the first clutch is completely open.

12. The control method according to claim 1, further comprising the step of controlling the second clutch, after the complete closing of the second clutch, so as to allow said second clutch to temporarily transmit a torque that is greater than a torque that will be transmitted by the second clutch immediately after the gear shift and is also greater than a torque transmitted by the first clutch immediately before the gear shift.

13. The control method according to claim 12, in a case of downshifting, further comprising the steps of: determining whether a driving style is an energy efficiency driving style; and not activating the engine to generate a torque after the complete opening of the first clutch and before the complete closing of the second clutch in a case of energy efficiency driving style.

14. The control method according to claim 1, in a case of downshifting, further comprising the steps of:
    determining whether a driving style is a sports driving style or a racing driving style; and
    activating the engine to generate a torque after the complete opening of the first clutch and so as to synchronize speed ($\omega_E$) of rotation of the drive shaft with speed ($\omega_B$) of rotation imposed by the gear ratio of the following gear, in case of a racing driving style.

15. A control method for carrying out a gear shift in a transmission provided with a dual-clutch gearbox, so as to shift from a current gear to a following gear;
    wherein the dual-clutch gearbox has two primary shafts, at least one secondary shaft connected to drive wheels, and a first clutch and a second clutch;
    wherein each first or second clutch is interposed between a drive shaft of an engine and a corresponding primary shaft, is in an oil bath and is pressure-controlled, namely a degree of opening/closing of the first or second clutch is determined by the pressure of the oil on an inside of said first or second clutch;
    the control method comprises the steps of:
    receiving a gear-shift command;
    opening the first clutch associated with the current gear;
    filling with oil the second clutch associated with the following gear after receiving the gear-shift command; and
    closing the second clutch as soon as the oil filling ends;
    wherein: the second clutch is filled by always supplying a maximum possible oil flow rate by means of an open-chain step control; the second clutch is completely closed at a maximum possible speed by means of the open-chain step control as soon as the oil filling in the second clutch ends; and the first clutch is completely opened at the maximum possible speed by means of the open-chain step control as soon as the oil filling in the second clutch ends;
    wherein a shifting time ($T_C$), during which the first clutch is completely opened at the maximum possible speed and the second clutch is completely closed at the maximum possible speed, is shorter than a successive synchronization time ($T_S$), during which a speed ($\omega_E$) of rotation of the drive shaft is synchronized with a speed ($\omega_B$) of rotation imposed by a gear ratio of the following gear.

* * * * *